United States Patent Office 3,773,741
Patented Nov. 20, 1973

3,773,741
NUCLEATED POLYPROPYLENE
Dominic A. Berta, Wilmington, Del., assignor to Hercules Incorporated, Wilmington, Del.
No Drawing. Filed Mar. 20, 1972, Ser. No. 236,451
Int. Cl. C08f 29/02
U.S. Cl. 260—93.7      2 Claims

ABSTRACT OF THE DISCLOSURE

The present invention relates to the nucleation of crystalline polymers of propylene. More particularly, it relates to a composition comprising a crystalline polymer of propylene and as a nucleator therefor a minor amount of potassium sulfate.

---

The term "crystalline polymer of propylene," as used herein, is inclusive of the crystalline or crystallizable homopolymers of propylene, which are variously referred to in the art as isotactic polypropylene, crystalline polypropylene or stereo-regular polypropylene, and solid copolymers of propylene with a minor amount of another olefin such as ethylene. All of such materials are plastics which are capable of being melted and which upon cooling solidify into a highly crystalline structure.

It is known in the art to add certain finely divided solid materials to crystalline polymers of propylene for the purpose of modifying the crystal structure of the polymer when it is cooled from the melt. Such materials are commonly referred to as nucleating agents as they serve to provide nuclei for crystallite growth. A properly nucleated polymer will, when solidified from the melt, possess improved clarity, hardness and tensile strength. One of the preferred nucleating agents has been sodium benzoate, the use of which is described in U.S. Pat. 3,207,739 to Michael Wales.

In accordance with the present invention, it has been found that crystalline polymers of propylene can be advantageously nucleated by the addition of potassium sulfate. In particular the use of this nucleating agent results in greater clarity and is believed to be obtainable through the use of any other known nucleating agent without any sacrifice in other physical properties of the polymer such as hardness and tensile strength.

Generally, the amount of potassium sulfate used will comprise from about .001 to 2% by weight of the polymer. The composition of the invention can be made by any of the known methods for incorporating an additive into a plastic polymer. It is essential for effective results that a substantial homogeneous distribution of the additive be obtained in the molten polymer prior to the final crystallization of the polymer. The additive may, for example, be added as a dry powder to the polymer while the polymer itself is in the form of a powder. Alternatively, the additive can be coated onto the surface of pellets of the polymer by slurrying the pellets in a solution of the additive and evaporating the solvent. The additive can also be mixed with the polymer in the melt or by any other method which results in uniform distribution of the addition in or upon the polymer.

The advantage of potassium sulfate as a nucleating agent comes to the fore in the normal processing of the polymer into a finished article as by injection molding, extrusion or the like where invariably the polymer is melted, formed and then cooled in the desired shape.

The following specific examples are presented to illustrate the invention. Parts and percentages are by weight unless otherwise specified.

EXAMPLE 1

Crystalline polypropylene flake was mixed with 1% potassium sulfate in a vibrating mixer. The resulting mixture was heated on a hot stage microscope to 210° C. to melt the polymer. The molten polymer was allowed to cool by shutting off the heat source. The polymer crystallization was observed through the microscope and the spherulite size was measured with a calibrated eyepiece. An average spherulite size of between 20 and 30 microns ($\mu$) was observed. Unnucleated polymer and polymer mixed as above with 1% sodium benzoate produced in the same test an average spherulite size of 250–300$\mu$ and 10–20$\mu$, respectively.

The same compositions, i.e., unnucleated polypropylene, polypropylene containing 1% potassium sulfate and polypropylene containing 1% sodium benzoate, were heated with a differential scanning calorimeter to 220° C. and allowed to cool at 120° C. The thermal energy released upon crystallization was measured as a function of time. The time to reach the maximum heat evolved was designated as the peak crystallization time and used to compare the rate of crystallization. The peak crystallization time for unnucleated polymer was measured at 1.6 minutes, while the mixtures with 1% potassium sulfate and 1% sodium benzoate gave values of 0.36 minute and 0.18 minute, respectively.

The example shows that potassium sulfate is an effective nucleating agent, essentially comparable in performance to sodium benzoate.

EXAMPLE 2

One hundred parts of stabilized crystalline polypropylene was mixed with 40 parts of water containing 0.1 part of dissolved potassium sulfate. The water was driven off by heating the mixture with steam and the resulting mixture pelletized on a screw extruder. A similar composition was made using 0.1 part of sodium benzoate in place of potassium sulfate. Injection molded plaques with a 40 mil thickness were made the two compositions using a screw extruder and a polished surface mold.

Table I lists the visually determined read-through clarity and dark background haze of the plaques. Percent haze was also measured by ASTM method D1003–61. As is evident the potassium sulfate nucleated example was superior in two of the three tests.

TABLE I

|  | Unnucleated polypropylene | 0.1% potassium sulfate nucleated polypropylene | 0.1% sodium benzoate nucleated polypropylene |
|---|---|---|---|
| Dark background, percent haze (visual) | 8 | 6 | 10 |
| "Read-through" clarity (visual)[1] | 5 | 7 | 10 |
| Measured percent haze (ASTM D1003–61) | 52.7 | 47.9 | 49.2 |

[1] On scale of 1 to 10 with increasing degree of clarity.

What I claim and desire to protect by Letters Patent is:

1. A composition comprising a crystalline polymer of propylene containing from .001 to 2% by weight of potassium sulfate as a nucleating agent.

2. The composition of claim 1 in which the polymer is polypropylene.

References Cited

UNITED STATES PATENTS 2,991,264  7/1961  Monroe et al. --- 260—94.9 GD

OTHER REFERENCES

Beck, Jour. Poly. Sci., vol. 1 (1967), pp. 673–685.

JOSEPH L. SCHOFER, Primary Examiner

E. J. SMITH, Assistant Examiner

U.S. Cl. X.R.

260—88.2 S, 94.9 GD